UNITED STATES PATENT OFFICE.

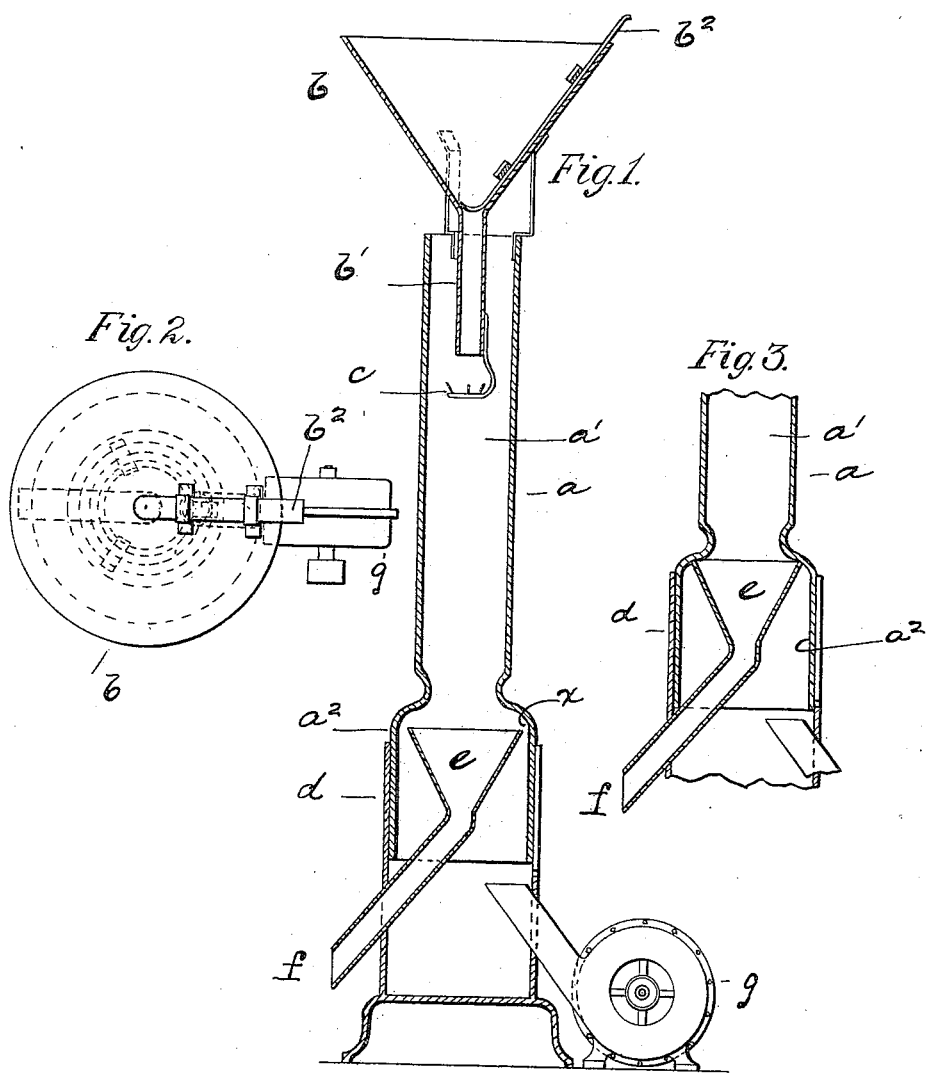

DANIEL P. COOLEY, OF GRANBY, CONNECTICUT, ASSIGNOR OF ONE-HALF TO THEODORE G. CASE, OF HARTFORD, CONNECTICUT.

SEED-CLEANING APPARATUS.

No. 816,560. Specification of Letters Patent. Patented April 3, 1906.

Application filed March 23, 1905. Serial No. 251,574.

*To all whom it may concern:*

Be it known that I, DANIEL P. COOLEY, a citizen of the United States of America, residing at Granby, in the county of Hartford and State of Connecticut, have invented certain new and useful Improvements in Seed-Cleaning Apparatus, of which the following is a specification.

The object of the invention is to produce a device of the class specified having features of novelty and advantage.

In the drawings, Figure 1 is a side elevation in section, illustrating an embodiment of my invention. Fig. 2 is a top view of the same. Fig. 3 is a detail sectional view.

Referring to the drawings, $a$ is a tubular member forming the cleaning-chamber $a'$. This is preferably made of transparent material, so that the cleaning operation can be watched and the necessary regulation accomplished. Mounted on the top of this tubular member is the delivery-funnel $b$, ending in a tube $b'$, which extends slightly into the tube of the chamber and has located at its lower end a spreader $c$, which scatters the seeds as they fall to the bottom of the chamber. This funnel is provided with a sliding gate $b^2$ to regulate the rate of discharge of the seeds into the cleaning-chamber. The tubular member $a$ is enlarged at its bottom, as at $a^2$, and is mounted in a suitable base $d$. This base carries a receiving-funnel $e$, having an outlet-orifice $f$. The receiving-funnel $e$ is located directly under the cleaning-chamber and receives the seeds as they drop to the bottom thereof. It is of slightly-larger diameter than the diameter of the chamber, and its upper edge underlies the shoulder formed by the enlargement $a^2$ of the tubular member $a$. It will be seen that by adjusting the tubular member up and down in the base the sides of the passage $x$ between the edge of the funnel and the tubular member may be varied. A suitable apparatus, such as the blast-fan $g$, is provided to supply an air-blast which passes through the passage $x$ and up through the cleaning-chamber.

The operation of the device will be apparent. The air-blast passing upwardly meets the falling seeds and carries up with it and out at the top of the cleaning-chamber any chaff or impurities, the seeds dropping into the receiving-funnel $e$ and passing out through the outlet-orifice. By watching the cleaning action through the transparent walls of the tubular member the volume of the air-blast can be regulated by adjusting the tubular member in its base until the cleaning operation is thoroughly effected. After the cleaning operation this device can be used to grade the seed by increasing the intensity of the draft so that the lighter seed will be carried out of the top of the cleaning-chamber and only the heavy ones drop into the receiving-funnel. Suitable provision should be made at the top of the chamber to collect the chaff or the lighter seeds and carry them away.

I claim as my invention—

1. In a device of the class specified a base, a tubular cleaning-chamber mounted in said base, the lower end of said chamber being enlarged to form a shoulder, a delivery-funnel mounted at the top thereof, a receiving-funnel extending into the bottom of said cleaning-chamber in operative relation to said shoulder to form an annular passage for an air-blast, said tubular member and receiving-funnel being adjustable with relation to one another to increase or diminish the size of said annular passage, and means for supplying an air-blast at the bottom of the cleaning-chamber.

2. In a device of the class specified the base, the tubular member adjustably mounted therein, the delivery-funnel arranged above said tubular member having a tube extending into the top thereof, a gate to control the discharge from said delivery-funnel, a spreader located underneath the tube on the delivery-funnel, a receiving-funnel located below the cleaning-chamber and having an outlet-orifice, and the blast-fan, substantially as described.

In testimony whereof I affix my signature in presence of two witnesses.

DANIEL P. COOLEY.

Witnesses:
 FREDERIC H. ALLEN,
 THEODORE G. CASE.